(12) United States Patent
Busch

(10) Patent No.: US 10,542,761 B2
(45) Date of Patent: Jan. 28, 2020

(54) METHOD, PROCESSING DEVICE AND PROCESSING LINE FOR MECHANICALLY PROCESSING AN ORGAN OR ORGANS TAKEN OUT FROM SLAUGHTERED POULTRY

(71) Applicant: MEYN FOOD PROCESSING TECHNOLOGY B.V., Oostzaan (NL)

(72) Inventor: Cornelis Busch, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 16/172,945

(22) Filed: Oct. 29, 2018

(65) Prior Publication Data

US 2019/0090496 A1   Mar. 28, 2019

Related U.S. Application Data

(62) Division of application No. 14/659,812, filed on Mar. 17, 2015, now Pat. No. 10,123,545.

(30) Foreign Application Priority Data

Mar. 18, 2014  (NL) ...................... 2012464

(51) Int. Cl.
*A22C 17/00* (2006.01)
*A22C 17/14* (2006.01)
(Continued)

(52) U.S. Cl.
CPC .............. *A22C 17/14* (2013.01); *A22C 21/00* (2013.01); *A22C 21/06* (2013.01)

(58) Field of Classification Search
CPC ...... A22C 17/0093; A22C 17/14; A22C 17/16
(Continued)

(56) References Cited

U.S. PATENT DOCUMENTS

| 2,534,685 A | 12/1950 | Shrader |
| 2,634,731 A | 4/1953 | Karlsson |

(Continued)

FOREIGN PATENT DOCUMENTS

| DK | 2103222 T3 | 3/2008 |
| EP | 0 141 432 A1 | 3/1982 |

(Continued)

OTHER PUBLICATIONS

Search report for NL 2012464, dated Jul. 15, 2014.

*Primary Examiner* — Richard T Price, Jr.
(74) *Attorney, Agent, or Firm* — Dority & Manning, P.A.

(57) ABSTRACT

A method and processing device for processing an organ package taken out from slaughtered poultry is provided. At least two cooperating rollers that define a nip between the rollers selectively allow preselected organs from the organ package to pass through the nip. The rollers during operation rotate in opposite directions in order to convey the organ package and simultaneously promote that the preselected organs pass through the nip, wherein the rollers have a cross-sectional diameter, the value of which varies as seen in the longitudinal direction of the rollers and depends on the location of the cross-section between an entrance portion and an exit portion of the rollers so as to provide each of the rollers with a superficial curved contour.

13 Claims, 4 Drawing Sheets

(51) Int. Cl.
*A22C 21/06* (2006.01)
*A22C 21/00* (2006.01)

(58) Field of Classification Search
USPC .................................................. 452/106–109
See application file for complete search history.

(56) References Cited

U.S. PATENT DOCUMENTS

| | | | |
|---|---|---|---|
| 3,749,004 A | 7/1973 | Pagdin | |
| 4,020,993 A | 5/1977 | Frazerhurst | |
| 4,382,313 A | 5/1983 | Harben | |
| 4,558,725 A | 12/1985 | Veneziale | |
| 4,624,031 A * | 11/1986 | Simard | A22C 25/02 452/99 |
| 4,691,629 A | 9/1987 | Koba | |
| 4,924,661 A | 5/1990 | Seymour | |
| 5,211,109 A | 5/1993 | Determan | |
| 5,529,100 A | 6/1996 | Koba | |
| 5,640,866 A | 6/1997 | Satoh | |
| 5,738,578 A * | 4/1998 | Marchese | A22C 9/008 452/142 |
| 6,766,738 B2 | 7/2004 | Blumm | |
| 7,322,285 B1 | 1/2008 | Wittig | |
| 8,869,690 B2 | 10/2014 | Wang | |
| 8,910,567 B2 | 12/2014 | Moch | |
| 2005/0124276 A1* | 6/2005 | Gagliardi, Jr. | A22C 9/004 452/142 |
| 2007/0254578 A1* | 11/2007 | Stewart | A22C 9/004 452/141 |
| 2008/0160892 A1 | 7/2008 | Reed | |
| 2011/0059684 A1* | 3/2011 | Van Den Nieuwelaar | A22C 21/0092 452/127 |
| 2015/0264944 A1* | 9/2015 | Busch | A22C 21/00 452/106 |
| 2015/0264945 A1* | 9/2015 | Busch | A22C 21/00 452/106 |
| 2015/0264946 A1* | 9/2015 | Busch | A22C 21/00 452/106 |

FOREIGN PATENT DOCUMENTS

| | | |
|---|---|---|
| EP | 1 769 681 A1 | 4/2007 |
| NL | 8502785 | 5/1986 |
| WO | WO 00/59311 | 10/2000 |

* cited by examiner

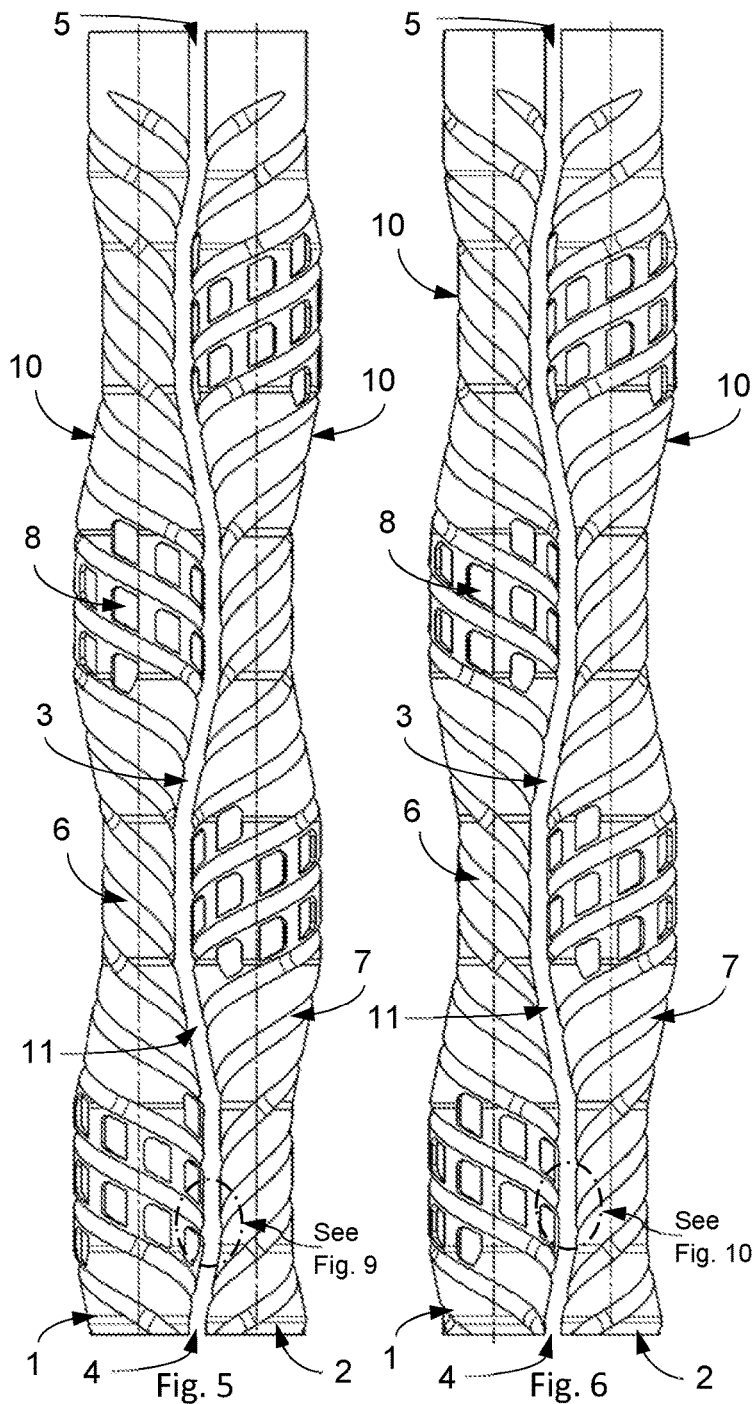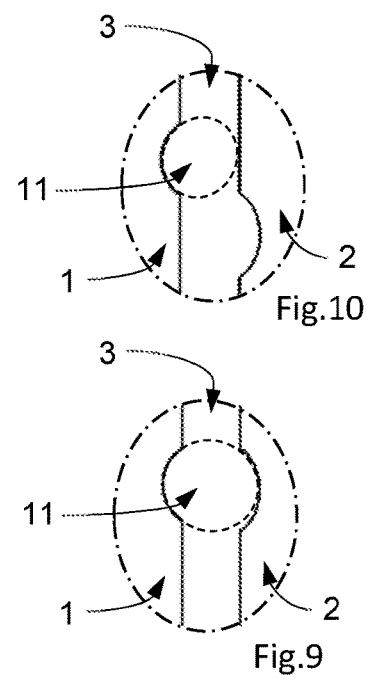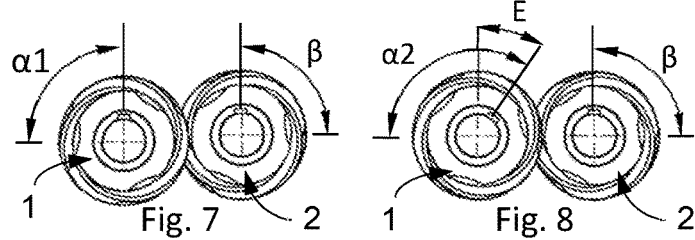

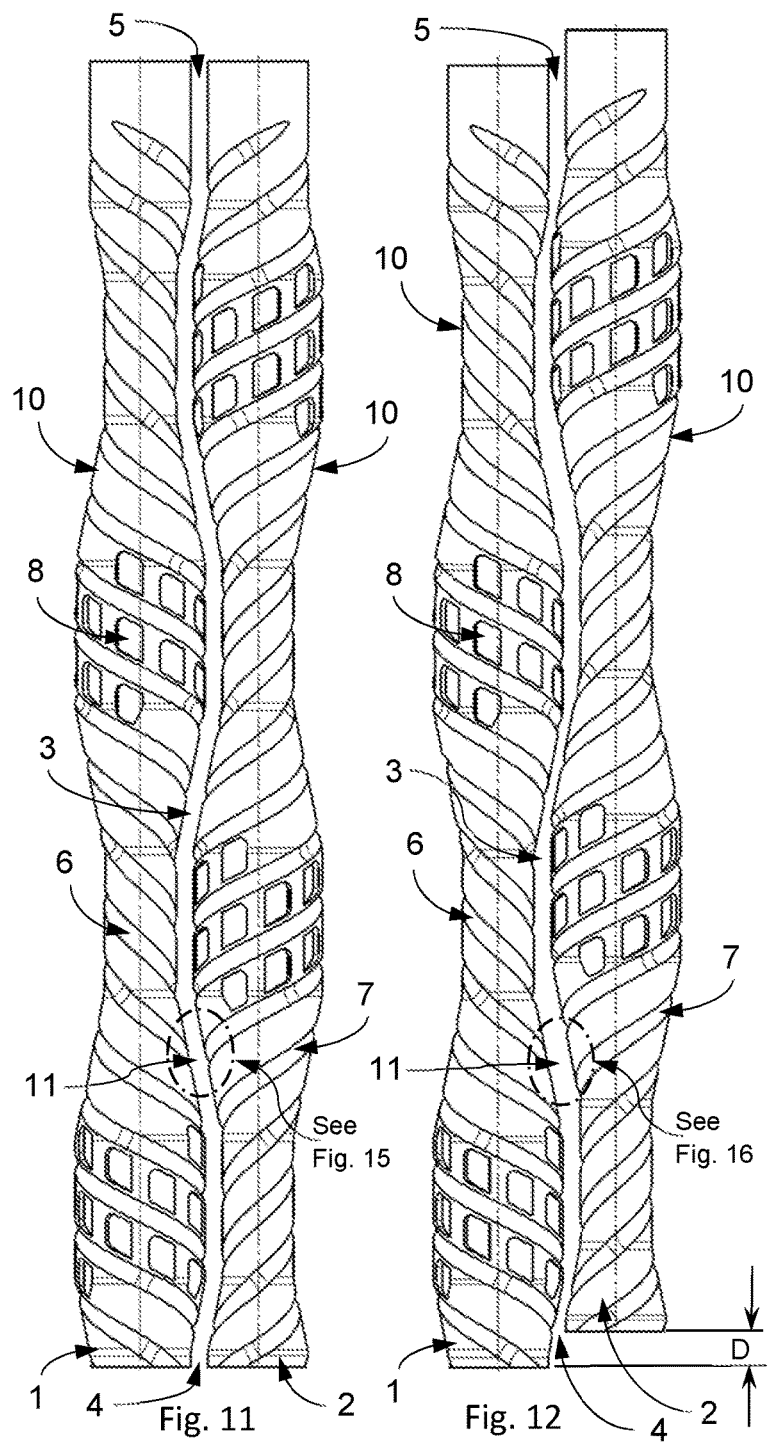
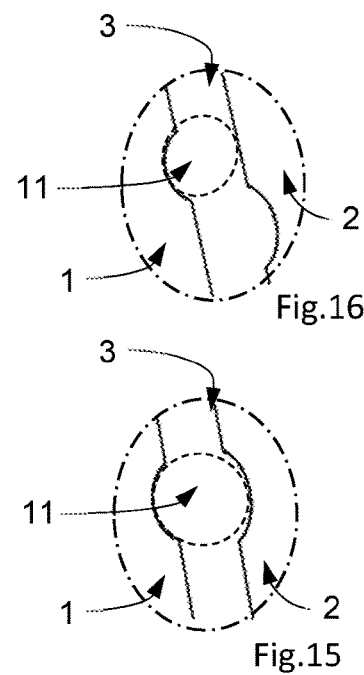
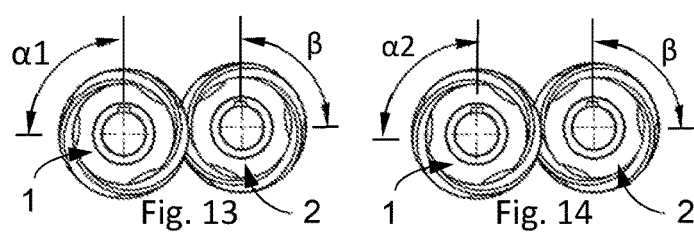

METHOD, PROCESSING DEVICE AND PROCESSING LINE FOR MECHANICALLY PROCESSING AN ORGAN OR ORGANS TAKEN OUT FROM SLAUGHTERED POULTRY

PRIORITY STATEMENT

The present application is a Divisional Application of and claims priority to U.S. patent application Ser. No. 14/659,812 filed Mar. 17, 2015, which claims priority under 35 U.S.C. § 119 to Dutch (NL) Application No. 2012464, filed Mar. 18, 2014, which is incorporated herein by reference for all purposes.

FIELD OF THE INVENTION

The subject matter of the present disclose relates generally to a method, processing device and processing line for mechanically processing an organ or organs taken out from slaughtered poultry

BACKGROUND OF THE INVENTION

The invention concerns a method for mechanically processing an organ or organs taken out from slaughtered poultry in a processing device or processing line, which organ or organs form part of an organ package and wherein the organ or organs are reoriented with the processing device before being separated from the organ package. Usually the organ package taken out from the poultry includes the intestines of the poultry.

The invention also relates to a processing line for harvesting an organ or organs from an organ package taken out from slaughtered poultry, which processing line includes at least one processing device for processing an organ or organs from the organ package.

EP-A-1 769 681 describes a method and device for mechanically processing a cluster of organs of a slaughtered animal, wherein the cluster is taken out of, and separated from, the body of the slaughtered animal. A clamping device is used to fix a particular organ within the cluster, which cluster is conveyed along a predetermined path. Then, tissue connections in the cluster are broken on the basis of the spatial orientation of the cluster, which is derived from the spot where the concerning organ is clamped. In this known device, separation of the intestines from the viscera package is executed by application of helical rollers that are driven in opposite directions with respect to each other, and wherein the organ package is fixed by clamping means above the rollers.

U.S. Publication No. 2008/0160892 discloses a method and apparatus for harvesting livers and hearts from a viscera package. An infeed pinch roller assembly is provided that does not include means to fix the viscera package above the roller assembly, which includes an intestine pull down and a liver and heart separator assembly. The viscera package is supplied to a pair of counter rollers. The package is captured by infeed pinch rollers thereby forcing the package into and between the rollers with only the gizzard remaining on top of the rollers. The left and right rollers converge along a nip line and the space between the rollers is sufficient to allow the liver and heart and the intestines to pass therethrough. The liver and heart are isolated and separated by a pulldown stripper assembly and a stripper arm assembly downstream of the rollers.

From EP-A-2 103 222 a separator is described that includes two cooperating rollers that are at least in part circumferentially provided with grooves. The first rollers define a preferably adjustable nip between the rollers for selectively allowing preselected organs from an organ package to pass through. During operation, the rollers rotate in opposite directions in order to convey the organ packages and simultaneously promote the preselected organ or organs to pass through the nip. This document also discloses that the rollers define a narrowing nip as seen in the conveying direction of the rollers, so as to cause that preselected organs are moved through the nip at the wider part of the nip while preselected other organs remain supported and conveyed by the rollers.

U.S. Pat. No. 4,382,313 discloses a processing device for harvesting gizzards. The device includes two cooperating rollers defining a nip between the rollers, each rotatably mounted at opposite ends in bearing blocks. The bearing blocks are adjustable so that the rollers can be shifted with respect to each other. Usually the bearing blocks are adjusted so that the rollers are generally parallel to each other and horizontally aligned, spaced apart at a distance that—due to the construction of the rollers—is variable along their length. The rollers have infeed and discharge ends with a tapered portion in between. The infeed portion has a first thread crest diameter, and the discharge portion has a second thread crest diameter being larger than the first thread crest diameter. The tapered portion has a thread crest diameter that increases from the first thread crest diameter at the infeed portion to the second thread crest diameter at the discharge portion. The nip between the rollers varies accordingly.

From NL 8502785, a device is known for separating gizzards from intestines taken out of slaughtered poultry. The device includes two parallel counter rotating rollers, which each have corresponding screw like circumferential ribs serving for conveying the gizzards and intestines. The forward ends of the rollers develop into a part with more densely provided ribs that eventually end into ribs having opposite pitch.

SUMMARY OF THE INVENTION

Aspects and advantages of the invention will be set forth in part in the following description, or may be obvious from the description, or may be learned through practice of the invention.

In general, methods and processing lines for mechanically processing an organ or organs taken out from slaughtered poultry with the aim to harvest the separate organs from the organ package are suffering from diverse problems such as organ packages or organs thereof are lost during processing, damage occurs to organs such as the liver and the heart, unintentionally certain organs such as gallbladders are not removed, or organs are not entirely separated and cause obstructions in the processing line. In certain prior art the packages are accelerated on top of the rollers, which means that the processing time is relatively short. Another disadvantage may be that dirt is gathered at or near the rollers.

The present invention addresses at least some of these problems and provides an alternative solution to existing methods and machines for processing an organ or organs that form part of an organ package and is taken out of slaughtered poultry.

To this end a method, a processing device and a processing line are proposed in accordance with the appended claims.

According to one exemplary aspect of the invention, a processing device for processing an organ package taken out from slaughtered poultry is proposed. The device includes at least two cooperating rollers that define a nip between the rollers for selectively allowing preselected organs from the organ package to pass through the nip. During operation, the rollers rotate in opposite directions in order to convey the organ package and simultaneously promote that preselected organs pass through the nip. The rollers have portions with relatively small diameters and portions with relatively large diameters with reference to each other, that are intermittently and repeatedly provided in the longitudinal direction of the rollers, to arrange that the rollers have a cross-sectional diameter.

The value of the cross-sectional 'diameter varies as seen in the longitudinal direction of the rollers, depending on the location of the cross-section between an entrance portion and an exit portion of the rollers, so as to provide each of the rollers with a superficial and repetitiously curved contour. According to this exemplary aspect of the invention, the rollers include a superficial curved contour, which surprisingly results in an improved positioning of the gizzard on top of the rollers, wherein the remainder of the organ package, notably the heart, the liver and the intestines are effectively guided through the nip to a position below the rollers enabling an effective further processing for separating the organs from each other.

The varying cross-sectional diameter of the rollers provides that each roller exhibits portions with relatively small diameters and portions with relatively large diameters in comparison with each other, and provides the advantage that the packages are repeatedly accelerated, decelerated, again accelerated etc. so that a massaging effect on the organ package is reached that effectively forces the above-mentioned remainder of the organ package below the rollers.

Due to the intermittent positioning of the portions with small diameters and portions with large diameters the organ package is moved from left to right and back while the package is being conveyed in the transport direction of the rollers. This causes the conveying speed of the organ packages to be reduced, which enables a more effective separation between the gizzard on top of the rollers and the remainder of the organ package below the rollers. Such also provides the advantage that portions of the organ package suspended unintentionally from the rollers on a side of these rollers distant from the nip, will be moved back particularly at the thicker portions of the rollers and moved through the nip to be suspended from the gizzard moving on top of the rollers.

An exemplary, preferred embodiment of the processing device of the invention has the feature that the rollers have superficial contours generally following the sinusoidal shape of a sine wave or cosine wave.

In one exemplary aspect of the invention that can be applied independent from the other features discussed herein, the superficial curved contours of cooperating first and second rollers are matching with each other so as to provide that a portion of the first roller with a relatively small diameter lies adjacent to a portion of the second roller with a relatively large diameter, and vice versa. The nip can then be predominantly constant along the length of the rollers, which supports the escape of small or weak gizzards from the top of the rollers. Consequently, loss of the complete organ package is prevented.

In practice it is desirable that the nip can be adjusted. In the prior art, this adjustment is done by adjusting the distance of the rollers at the entrance side which receives the organ packages. The nip between the rollers then converges in the conveying direction of the rollers from a wider part to a narrower part. In the prior art, this has the consequence that many organ packages are lost shortly or immediately after placement at the entrance side of the rollers. In another exemplary aspect of the invention, which also promotes that escape of small or weak gizzards through the nip between the rollers and loss of the complete organ package is prevented, the cooperating rollers are adjustable exactly perpendicular to the rollers' longitudinal direction so as to provide that the nip is adjustable to a pre-established constant value—which applies along the entire longitudinal direction of the rollers. Also this feature can be applied independent from the other features of the invention mentioned here above as well as independent from the following features.

In another embodiment of the processing device of the invention at least one of the cooperating rollers is adjustable with respect to the other roller in its longitudinal direction so as to adjust the nip between the rollers. The nip is then not necessarily constant throughout the length of the rollers but this may be desirable in certain circumstances.

In yet another exemplary embodiment of the processing device of the invention in which the rollers are provided with grooves, it may also be beneficial that at least one of the cooperating rollers is adjustable with respect to the other roller in its longitudinal direction so as to adjust a space provided by the respective grooves in the direction of the nip of the cooperating rollers. This space can then be occupied by one of the organs residing on top of the rollers, which should be caught and moved through the nip to have the organ suspend below the rollers. Also this exemplary feature can be applied independent from the other features discussed herein. It is possible to arrive at the same effect by phase-adjusting at least one of the cooperating rollers in its rotational position with respect to the other roller. A limited and temporary additional rotation of one of the rollers is sufficient to adjust a space provided by the respective grooves in the direction of the nip of the cooperating rollers.

Independent from the foregoing features or in addition thereto it is preferred, in another exemplary embodiment, that the rollers are provided with pockets around the rollers' circumference. The pockets serve the purpose of catching the organs and providing room for them to move these organs through the nip to below the rollers. Such pockets can also be effectively applied with certain prior art straight rollers.

In another exemplary aspect of the present invention, it is desirable that the pockets are provided in different types, each type having a different depth than another type to suit for the different sizes of the organs that have to be caught.

In another exemplary embodiment, it is preferable that the pockets are provided with edges that are rounded in order to prevent the organs from being damaged. By selecting the appropriate level in which the edges are rounded, it is also possible that the pockets effectively loosen the liver from the gizzard.

It is discovered that the most preferential placing of the pockets is around the roller's circumference at portions of the rollers where the rollers exhibit relatively large diameters.

The invention is also embodied in a processing line embodied with one or more processing devices with the exemplary features as discussed herein.

The invention will hereinafter be further elucidated with reference to the drawing of a non-limiting processing device according to the invention embodied with a combination of preferred features. It is, however, expressly remarked that these features can also be applied independent from each other. To save on space, it is believed that using the teachings disclosed herein, the skilled person is able to imagine how particular features can be applied separate from other features. It is further remarked that particular features as discussed herein, such as the pockets provided at the circumference of the rollers, can be applied with similar effect in a processing device with rollers that are straight in accordance with the prior art. Evidently such straight rollers with pockets as described herein are also covered by the invention.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 is another top view of the rollers of FIG. 1.

FIG. 6 is another top view of the rollers of FIG. 1.

FIG. 7 is an end view of the rollers of FIG. 5.

FIG. 8 is another end view of the rollers of FIG. 6.

FIG. 9 is a close-up view of the area designated with dashed lines in FIG. 5.

FIG. 10 is a close-up view of the area designated with dashed lines in FIG. 6.

FIG. 11 is another top view of the rollers of FIG. 1.

FIG. 12 is another top view of the rollers of FIG. 1.

FIG. 13 is an end view of the rollers of FIG. 11.

FIG. 14 is an end view of the rollers of FIG. 12.

FIG. 15 is a close-up view of the area designated with dashed lines in FIG. 11.

FIG. 16 is a close-up view of the area designated with dashed lines in FIG. 12

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention.

In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

In the following, the purposes of clarity, the description is restricted to showing a processing device in accordance with exemplary aspects of the invention. Using the teachings disclosed herein, it is within the ambit of the skilled person to apply such a processing device in a processing line of poultry. Consequently, the machines or machine parts that constitute such a processing line are not shown because those features are known to the skilled person. Similarly, the organ package or packages that may be treated and processed in the processing device of the invention are not shown because such organ packages are also known to the skilled person. Moreover the organ packages as such are not a claimed part of the protective scope of the invention.

Figure 1:
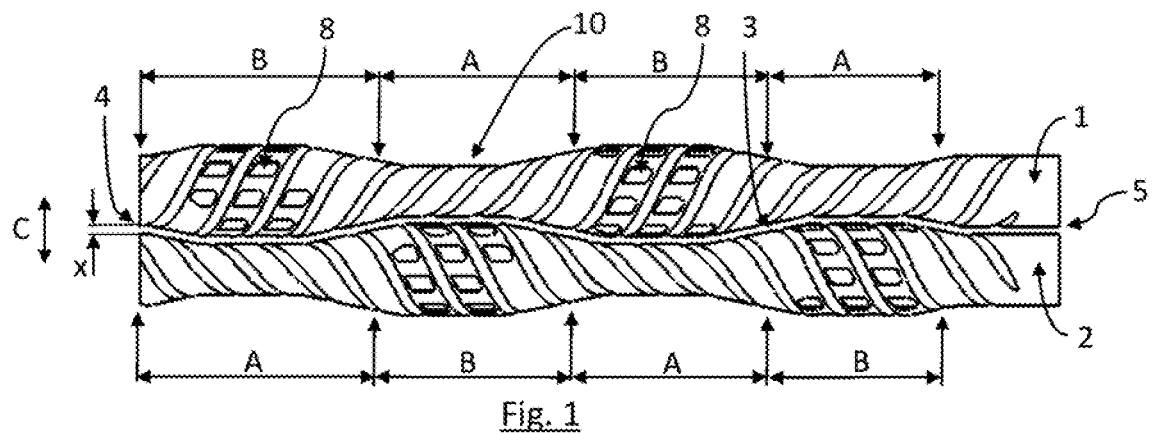
FIG. 1 shows a top view of the rollers of a processing device according to an exemplary embodiment of the invention.

Turning to FIG. 1, the two cooperating rollers 1, 2 of an exemplary processing device of the invention are shown in a top view. The rollers 1, 2 define a nip 3 between the rollers 1, 2 for selectively allowing preselected organs from an organ package to pass through the nip 3. The rollers 1, 2 rotate in opposite directions as shown in FIG. 3 in order to convey the organ package and simultaneously promote that preselected organs pass through the nip 3.

Figure 3:
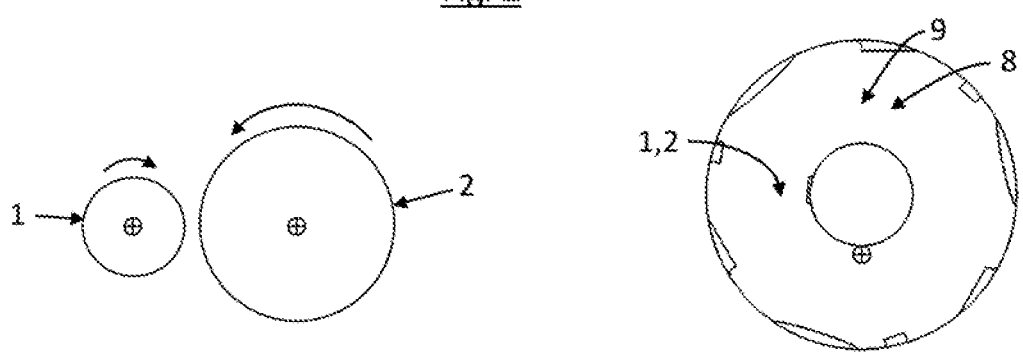
FIG. 3 shows a cross section of the rollers of FIG. 1.

As clearly follows from what is shown in FIG. 1 and FIG. 3, the rollers 1, 2 have a cross-sectional diameter, the value of which varies as seen in the longitudinal direction of the rollers and depends on the location of the cross-section between an entrance portion 4 and an exit portion 5 of the rollers 1, 2. This provides each of the rollers 1, 2 with a superficial curved contour 10. According to what FIG. 1 shows, the rollers 1, 2 preferably have superficial contours 10 that generally follow a sinusoidal shape such as e.g., a sine wave or cosine wave.

FIG. 1 depicts that the varying cross-sectional diameter of the rollers 1, 2 provides that each roller 1, 2 exhibits one or more portions A with relatively small diameters and one or more portions B with relatively large diameters in comparison with each other. It is also shown that the portions A with relatively small diameters and the portions B with relatively large diameters are intermittently provided in the longitudinal direction of the rollers 1, 2. Furthermore the superficial curved contours of the cooperating first and second rollers 1, 2 are matching with each other so as to provide that a portion A of the first roller 1 with a relatively small diameter lies adjacent to a portion B of the second roller 2 with a relatively large diameter, and vice versa.

Making further reference to FIG. 1, the double arrow C illustrates that the cooperating rollers 1, 2 are adjustable exactly perpendicular and transverse to the rollers 1, 2 longitudinal direction so as to provide that the nip 3 is adjustable to a pre-established constant value X, which applies along the entire longitudinal direction of the rollers 1, 2.

Figure 2:
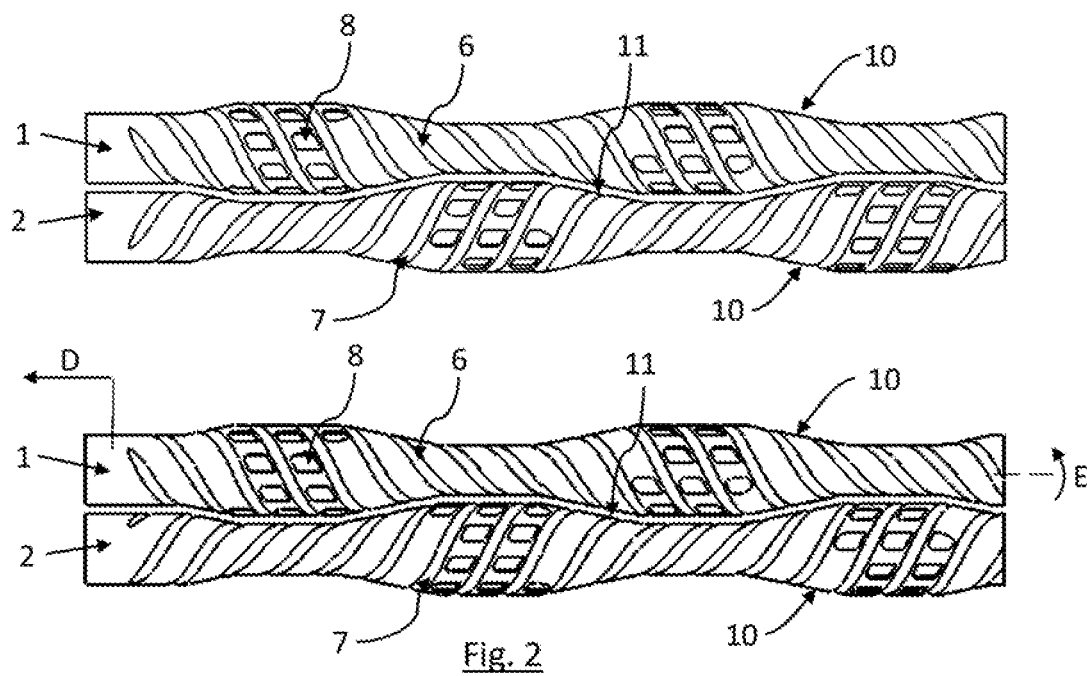
FIG. 2 shows a top view of rollers in a first relative longitudinal position and a top view of rollers in a second relative longitudinal position with respect to each other.
Figure 17:
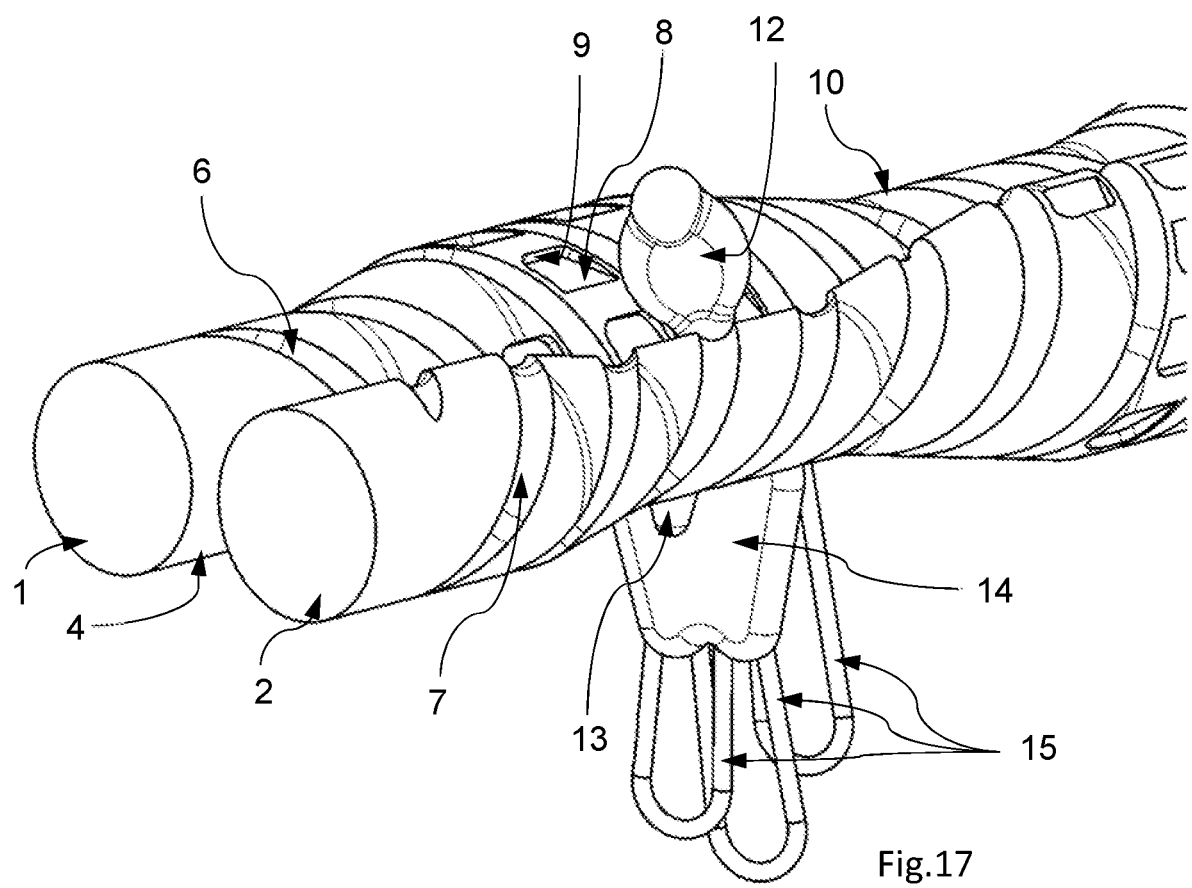
FIG. 17 is a perspective view of a portion of one end of the rollers in FIG. 1 with an organ package also depicted.
Figure 18:
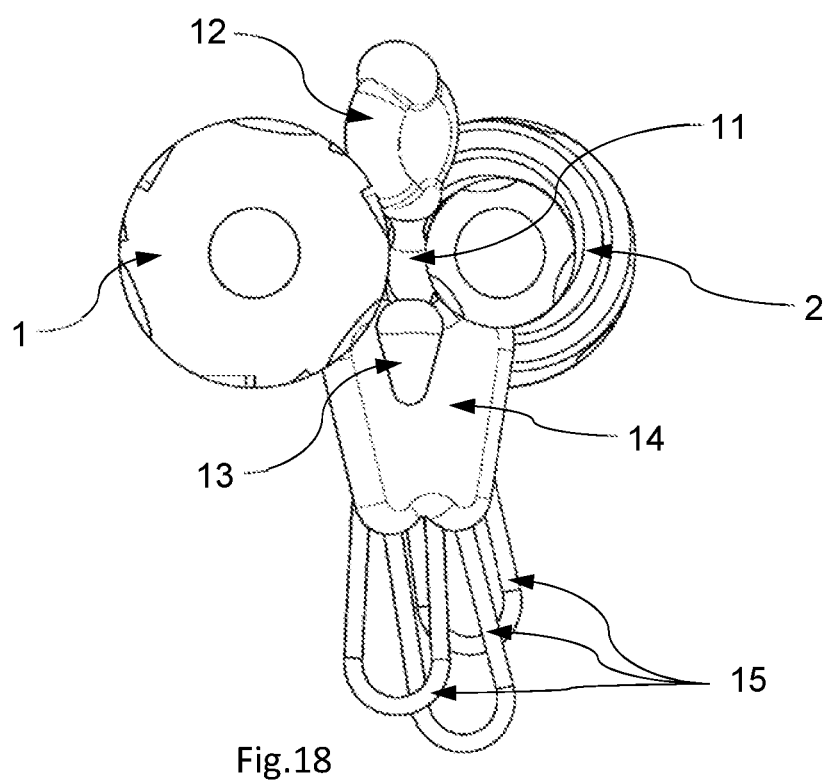
FIG. 18 is an end view of the rollers in FIG. 17 with an organ package also depicted.

FIG. 2 shows another option to adjust the width of the nip 3 to a desired value. The top part of FIG. 2 shows the rollers 1, 2 in a first longitudinal position corresponding to what is shown in FIG. 1. The lower part of FIG. 2 illustrates the effect in an embodiment of the processing device of the invention in which at least one of the cooperating rollers 1 is adjustable in its longitudinal direction with reference to the other roller 2 so as to adjust the nip 3 between the rollers 1, 2. The longitudinal displacement of the roller 1 is indicated with arrow D. FIG. 2 also shows the effect with reference to the positioning of the grooves 6, 7 on the rollers 1, 2. Similarly, a comparison of FIGS. 11 and 12 illustrates the longitudinal displacement of roller 1 by an amount D relative to roller 2. FIGS. 13 and 14 provide end views of rollers 1 and 2 in FIGS. 11 and 12, respectively, and indicate no rotational adjustment has occurred. FIGS. 15 and 16 provide a close-up illustrating the effect on space 11 of the movement by amount D. In one exemplary embodiment, one roll 1 of the cooperating rollers 1, 2 is phase-adjusted in its rotational position with respect to the other roll 2 by a limited rotation of roll 1 according to arrow E so as to adjust a space 11 provided by the respective grooves 6, 7 in the direction of the nip 3 of the cooperating rollers 1, 2. Similarly, comparisons of FIG. 5 with FIG. 6 and FIG. 7 with FIG. 8 illustrates the change in rotational position or roller 1 relative roller 2 by an amount according to arrow E. FIGS. 9 and 10 provide a close-up illustrating the effect on space 11 of the rotational movement according to arrow E In another exemplary embodiment, this is done by providing that at least one roll 1 of the cooperating rollers 1, 2 is adjustable in its longitudinal direction with respect to the other roll 2 of the cooperating rollers 1, 2. Also then it is possible to adjust the space 11 provided by the respective grooves 6, 7 in the direction of the nip 3 of the cooperating rollers 1, 2. In the top part of FIG. 2, the cooperating grooves 6, 7 provide more room for receiving an organ therein than the staggered grooves 6, 7, which are shown in the lower part of FIG. 2. FIGS. 17 and 18 provide an exemplary illustration of a gizzard 12, heart 13, liver 14, and intestines 15 relative to rollers 1 and 2 in space 11. It is remarked that in a particular exemplary embodiment, part of the grooves may have an opposite pitch with reference to the remainder of the grooves.

Figure 4:
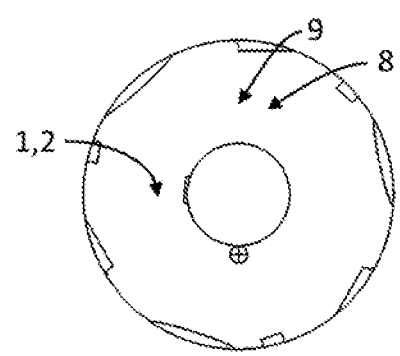
FIG. 4 shows a cross section of a single roll showing a particular aspect of the applied pockets in the circumference of the roll.

Returning again to FIG. 1, another exemplary feature of the invention is shown, notably that the rollers 1, 2 are provided with pockets 8 around the rollers' circumference. This is also shown in the cross-sectional view of FIG. 4. It is preferred that the pockets 8 are provided in different types, each type having a different depth than another type. This is not shown in the figures but requires no further elucidation for the skilled person. Preferably the pockets 8 are provided with edges 9 that are rounded. From FIG. 1, it is clear that the pockets 8 are provided around the roller's circumference at portions of the rollers 1, 2 where the rollers exhibit relatively large diameters—that is in the regions that are depicted with B.

Although the invention has been discussed in the foregoing with reference to an exemplary embodiment of the processing device of the invention, the invention is not restricted to this particular embodiment which can be varied in many ways without departing from the gist of the invention. The discussed exemplary embodiment shall therefore not be used to construe the appended claims strictly in accordance therewith. To the contrary, the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment. While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A processing device for processing an organ package taken out from slaughtered poultry, the device comprising:
   at least two cooperating rollers, wherein the rollers comprise
      portions with relatively small diameters; and
      portions with relatively large diameters that are intermittently and repeatedly provided in a longitudinal direction of the rollers to arrange that the rollers have a cross-sectional diameter, the value of which varies as seen in the longitudinal direction of the rollers, wherein the value of the diameter depends on the location of the cross-section between an entrance portion and an exit portion of the rollers so as to provide each of the rollers with a superficial, repetitiously curved contour;
   a nip between the rollers for selectively allowing preselected organs from the organ package to pass through the nip, wherein during operation the rollers rotate in opposite directions in order to convey the organ package and simultaneously promote that the preselected organs pass through the nip.

2. The processing device according to claim 1, wherein the rollers have a varying cross-sectional diameter such that each roller exhibits portions with relatively small diameters and portions with relatively large diameters in comparison with each other.

3. The processing device according to claim 1, wherein the rollers have superficial contours generally following a sinusoidal shape such as a sine wave or cosine wave.

4. The processing device according to claim 3, wherein the superficial curved contours of the cooperating first and second rollers are matching with each other so as to provide that a portion of the first roller with a relatively small diameter lies adjacent to a portion of the second roller with a relatively large diameter, and vice versa.

5. The processing device according to claim 1, wherein the cooperating rollers are adjustable perpendicular and transverse to the rollers' longitudinal direction so as to provide that the nip is adjustable to a pre-established constant value that applies along the entire longitudinal direction of the rollers.

6. The processing device according to claim 1, wherein at least one of the cooperating rollers is adjustable with respect to the other roller in its longitudinal direction so as to adjust the nip between the rollers.

7. The processing device according to claim 1, wherein the rollers comprise grooves, and wherein at least one of the cooperating rollers is adjustable with respect to the other roller in its longitudinal direction so as to adjust a space provided by the respective grooves in the direction of the nip of the cooperating rollers.

8. The processing device according to claim 1, wherein the rollers are provided with grooves, and wherein at least one of the cooperating rollers is phase-adjusted in its rotational position with respect to the other roller so as to adjust a space provided by the respective grooves in the direction of the nip of the cooperating rollers.

9. The processing device according to claim 1, wherein the rollers are provided with pockets around the rollers' circumference.

10. The processing device according to claim 9, wherein the pockets are provided in different types, each type having a different depth than another type.

11. The processing device according to claim 9, wherein the pockets are provided with edges that are rounded.

12. The processing device according to claim 1, wherein the rollers are provided with pockets around the roller's circumference at portions of the rollers where the rollers exhibit relatively large diameters.

13. The processing line comprising the processing device of claim 1.

* * * * *